United States Patent
Wolkovitz et al.

(10) Patent No.: US 12,519,501 B2
(45) Date of Patent: Jan. 6, 2026

(54) TRANSMITTER-CONTROLLED RECEIVER ACTIVATION AND DEACTIVATION FOR ALTERNATE CURRENT (AC)-COUPLED DATA SIGNALING

(71) Applicant: NVIDIA Corporation, Santa Clara, CA (US)

(72) Inventors: Omer Wolkovitz, Kfar Saba (IL); Ofek Abadi, Nahariya (IL)

(73) Assignee: NVIDIA Corporation, Santa Clara, CA (US)

( * ) Notice: Subject to any disclaimer, the term of this patent is extended or adjusted under 35 U.S.C. 154(b) by 326 days.

(21) Appl. No.: 18/237,649

(22) Filed: Aug. 24, 2023

(65) Prior Publication Data
US 2025/0070817 A1    Feb. 27, 2025

(51) Int. Cl.
| | |
|---|---|
| H04B 1/00 | (2006.01) |
| H03K 17/56 | (2006.01) |
| H04B 1/401 | (2015.01) |
| H04B 1/44 | (2006.01) |

(52) U.S. Cl.
CPC .............. *H04B 1/44* (2013.01); *H03K 17/56* (2013.01); *H04B 1/401* (2013.01)

(58) Field of Classification Search
CPC ........... H04B 1/44; H04B 1/401; H03K 17/56
See application file for complete search history.

(56) References Cited

U.S. PATENT DOCUMENTS

| | | | |
|---|---|---|---|
| 8,624,641 B1 * | 1/2014 | Faucher | H03F 3/2171 327/170 |
| 2024/0014846 A1 * | 1/2024 | Din | H04B 1/48 |

FOREIGN PATENT DOCUMENTS

| | | | | |
|---|---|---|---|---|
| CA | 2242919 A1 * | 7/1997 | | H03C 3/0958 |

OTHER PUBLICATIONS

Y. Nishi et al., "A 0.190-pJ/bit 25.2-Gb/s/wire Inverter-Based AC-Coupled Transceiver for Short-Reach Die-to-Die Interfaces in 5-nm CMOS," 2023 IEEE Symposium on VLSI Technology and Circuits (VLSI Technology and Circuits), 2023, 2 pages.

* cited by examiner

*Primary Examiner* — Ping Y Hsieh
(74) *Attorney, Agent, or Firm* — Lowenstein Sandler LLP

(57) ABSTRACT

A system includes a transmission driver coupled to a channel, a capacitor coupled in series to the channel, and a receiver coupled to the channel. The receiver includes a front-end circuit to detect, as data, transitions in voltage over the channel, the front-end circuit including an activation switch. A voltage swing detector is coupled between the channel and the activation switch. The voltage swing detector detects a voltage swing in the voltage that satisfies one of a first threshold value or a second threshold value and causes, in response to the detection, the activation switch to one of open or close, respectively.

22 Claims, 13 Drawing Sheets

700

---

Determine, by the processing core, that the transmission driver is to one of exit or enter a transmission mode.
710

↓

Trigger, by the processing core, the transmission driver to cause a voltage of the channel to at least satisfy one of a first threshold value or a second threshold value, respectively.
720

↓

Detect, by the voltage swing detector, a voltage swing in the voltage of the channel that satisfies one of the first threshold value or the second threshold value, respectively.
730

↓

Cause, by the front-end circuit, in response to detecting the voltage swing, the activation switch to one of open or close, respectively.
740

FIG. 7

TRANSMITTER-CONTROLLED RECEIVER ACTIVATION AND DEACTIVATION FOR ALTERNATE CURRENT (AC)-COUPLED DATA SIGNALING

TECHNICAL FIELD

At least one embodiment generally pertains to communication systems, and more specifically, but not exclusively, to transmitter-controlled receiver activation and deactivation for AC-coupled data signaling.

BACKGROUND

For short-reach, die-to-die communication over silicon interposers or similar high-density interconnects, several different single-ended techniques have been developed, such as Ground-Reference Signaling (GRS) or Simultaneous Bi-Directional Signaling (SBD). Since the bandwidth-to-pins value is a metric to be minimized in parallel communication systems, many parallel communication systems (including single-ended AC-Coupled parallel communication systems) are implemented using single-ended signaling.

Another architecture used for low-power consumption includes single-ended AC-coupled signaling, in which the transmitter drives the channel through a serial capacitor, e.g., a series-connected capacitor. By using the serial capacitor, the information sent by the transmitter to the receiver side includes only data transitions, while the direct current (DC) level of the transmitter is decoupled from the transmitted signal. Thus, single-ended AC-coupled signaling requires a DC restoration mechanism on the receiving side, e.g., in the receiver, to determine those data transitions. Implementing such a DC restoration mechanism, however, consumes direct current even when there is no transmission signal on the channel between the dies, resulting in a power dissipation waste during idle mode operation.

BRIEF DESCRIPTION OF DRAWINGS

Various embodiments in accordance with the present disclosure will be described with reference to the drawings, in which:

FIG. 7 is a flow chart of an example method for operating an AC-coupled signaling system according to various embodiments.

DETAILED DESCRIPTION

Figure 1A:
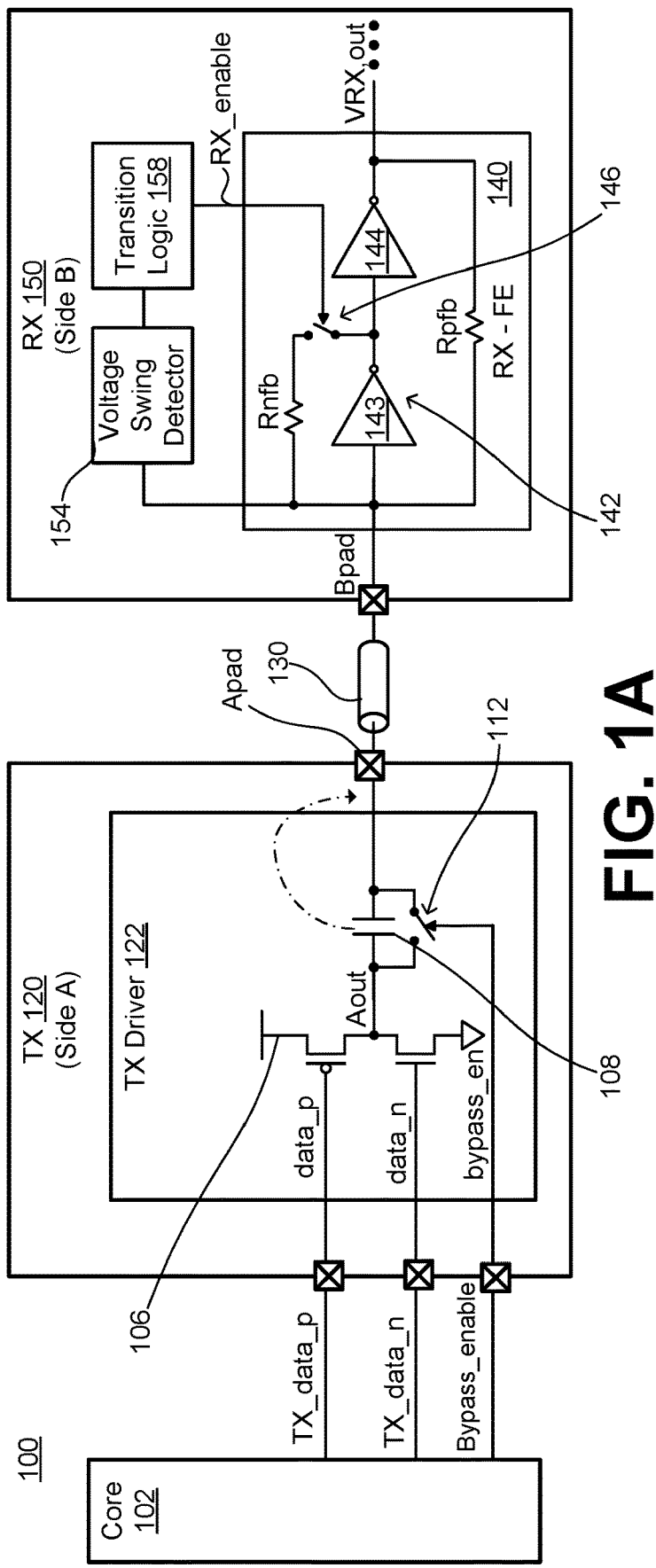
FIG. 1A is a schematic block diagram of an example AC-coupled signaling system implementing activation and deactivation of a transmission mode according to various embodiments.

In some implementations of parallel interfaces in communication systems, e.g., single-ended AC-coupled signaling across dies or integrated circuit chips, as was discussed, implementing a DC restoration mechanism to detect data consumes direct current even when there is no transmission signal on the channel between the dies or chips. This constant direct current consumption results in a power dissipation waste during idle mode operation, which in many transceivers, leads to significant power losses.

In some such parallel interfaces, a mechanism is inserted into the receiver to deactivate the receiver during idle modes to avoid this excess power consumption. In such parallel interfaces, these mechanisms are controlled by back channels (i.e., side-band links), which require additional hardware and experience excessive latency. A back channel is an additional slow-rate communication channel that is responsible for delivering a system command between two sides (e.g., transmitter/receiver) of a high-speed link system. Accordingly, the use of back-channel communication to signal when to switch the receiver ON and OFF remains an insufficient solution due to the slow rate.

Aspects and embodiments of the present disclosure address the above deficiencies by employing a voltage swing detector directly within the receiver (e.g., not in the back channels) that detects a transitional command, from the transmitter, formatted as a voltage level. For example, the voltage swing detector can be coupled between the channel and an activation switch of the front end of the receiver. In some embodiments, when the transmitter causes the voltage across the channel to satisfy (e.g., meet or exceed) either a high threshold voltage or a low threshold voltage (depending on whether the transmitter wants to exit or enter a transmission mode), the voltage swing detector can detect this voltage swing and direct the receiver accordingly. A transmission mode of operation is a mode in which the transmitter sends voltage transitions to the receiver, which transitions the receiver detects as data, or in other words, the active transmission of data.

In these embodiments, in response to detecting the channel voltage satisfying a first (or low) threshold value (e.g., a pull-down voltage), the voltage swing detector outputs a first signal that causes the activation switch to open, deactivating the receiver. Similarly, in another embodiment, in response to detecting the channel voltage satisfying a second (or high) threshold value (e.g., a pull-up voltage), the voltage swing detector outputs a second signal that causes the activation switch to close, reactivating the receiver to resume transmission mode. While these transition commands from the transmitter can be reversed with opposite-designed logic (e.g., satisfying the low threshold voltage triggers deactivation and satisfying the high threshold voltage triggers reactivation of transmission mode), the result is the same: direct control of the transmission state of transceivers coupled across dies or chips from the transmitter to the receiver without the use of back-channel signaling.

Therefore, advantages of the receivers, systems, and methods implemented in accordance with some embodiments of the present disclosure include, but are not limited to, significant improvement of power management in single-ended AC-coupled signaling across parallel communication interfaces. These improvements will be noticeable in significantly less power consumption (with concomitant cost savings), while avoiding unacceptable slowing of transmission mode transitions by not implementing back-channel signaling to manage these transmission mode transitions. Advantages also include the prevention of degradation of transistors and other electronics of the transceiver when relaxed due to power management. Other advantages will be apparent to those skilled in the art of single-ended AC-coupled signaling, as will be discussed hereinafter.

FIG. 1A is a schematic block diagram of an example AC-coupled signaling system 100 implementing activation and deactivation of a transmission mode according to various embodiments. In various embodiments, the system 100 includes a processing core 102 (or processing device) and a transceiver made up of a transmitter 120 (on a first or Side A of the transceiver) and a receiver 150 (on a second or Side B of the transceiver) coupled to each other across a channel 130. In some embodiments, the transceiver is referred to as an inverter-based, AC-coupled toggle (ISR-ACT) transceiver. In these embodiments, the channel 130 is located on a line coupled between an A side pad (Apad) of the transmitter 120 and a B side pad (Bpad) of the receiver 150, where the line is relatively short so that the transmitter 120 and the receiver 150 are positioned close together, as is typical in high-speed links. Although it is understood that the parallel interface between side A and Size B may include a series of transceivers, each with a separate channel, this multiplication of transceivers is not illustrated for purposes of clarity.

In these embodiments, the transmitter includes a transmission driver 122, which in turn includes an inverter 106 that receives both positive (or non-inverted) data (data_p) and negative (or inverted) data (data_n) of differential inputs, and passes the data as bits to a capacitor 108 that is coupled in series to the channel 130 (e.g., where the capacitor 108 was previously referred to as a serial capacitor). In some embodiments, the capacitor 108 is positioned outside of the transmission driver 122 (indicated by the dashed line), e.g., but may still be on-chip of the transmitter 120, and thus the location of the capacitor is flexible. In these embodiments, the transmitter 120 (e.g., the transmission driver 122 in one embodiment) includes a bypass switch 112 located across the capacitor 108 and coupled to the processing core 102, e.g., via bypass enable (bypass_en) signal. In this way, the processing core 102 directs the timing of the data bits and whether the capacitor 108 is allowed to be charged with data transitions for those bits, as will be explained in more detail.

In some embodiments, the ISR-ACT's transmitter sends non-return-to-zero (NRZ) data through the capacitor 108, e.g., as low-voltage-swing pulses, into the line that includes the channel 130. In these embodiments, the receiver 150 amplifies these low-voltage-swing pulses using a first-stage transimpedance amplifier (TIA) to fully toggle a second-stage output, where positive feedback to the input maintains the DC level on the channel line.

More specifically, in some embodiments, the receiver 150 includes a front-end circuit 140 having a series of inverters 142 coupled to the input pad (Bpad), a negative feedback resistor (Rnfb) coupled between the input and a connection between at least two inverters (e.g., a first inverter 143 and a second inverter 144 of the series of inverters 142). The above-mentioned first-stage TIA may be implemented by the first inverter 143 and the Rnfb resistor. The front-end circuit 140 may further include a positive feedback resistor (Rpfb) coupled between an output of the second inverter 144 and the input to the series of inverters 142.

Figure 1B:
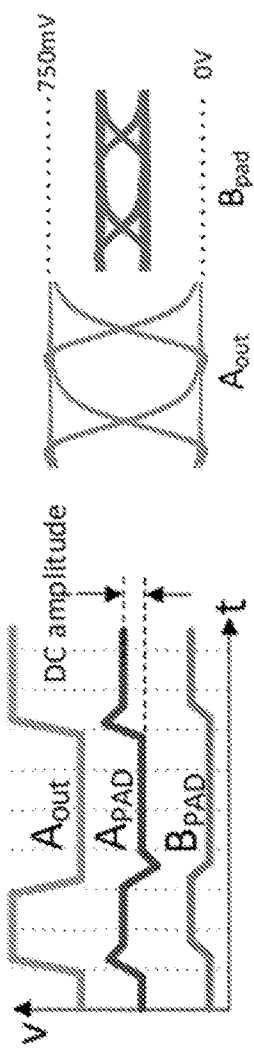
FIG. 1B is a graph illustrating transmitter outputs and receiver input (FIG. 1A), and thus the need to maintain an input DC level at the receiver according to various embodiments.

FIG. 1B is a graph illustrating transmitter outputs and receiver input (FIG. 1A), and thus the need to maintain an input DC level at the receiver according to various embodiments. For example, Aout illustrates the output signal of the inverter 106, Apad illustrates the output signal of the transmitter 120, and Bpad illustrates the input signal of the receiver 150. As can be observed, the voltage at Apad, and thus also passed to Bpad (input to the receiver 150), is greatly diminished compared to that of the Aout voltage. Thus, the series of inverters 142 and the feedback voltage provided via the positive feedback resistor (Rpfb) work to amplify the voltage signal within the front-end circuit 140 to restore the DC level and thus be able to detect voltage transitions that correlate to data bits being passed over the channel 130.

As was previously discussed, implementing a DC restoration mechanism to detect data tends to consume direct current even when there is no transmission signal on the channel 130, e.g., resulting in a power dissipation waste during idle mode operation, which can lead to significant power losses in the transceiver made up of the transmitter 120 and the receiver 150. To address this deficiency, with additional reference to the embodiments of FIG. 1A, the front-end circuit 140 is adapted to include an activation switch 146 that is controlled (e.g., by an RX_enable signal) to deactivate the receiver 150 to enter an idle mode and to reactivate the receiver 150 to resume transmission mode.

In at least some embodiments, the activation switch 146 is included in the negative feedback loop of the series of inverters 142 to selectively disconnect the negative feedback loop. In these embodiments, when the activation switch 146 is opened, the positive feedback loop stays connected and forces the input voltage of the front-end circuit 140 to either be pulled down to GND or to be pulled up to the supply voltage (VDD) to deactivate the receiver 150, thus eliminating direct DC current consumption. In some embodiments, the logic of the front-end circuit 140 can be reversed so that the signal triggers described above are reversed to change between transmission mode and idle mode, as would be apparent to those skilled in the art.

In at least some embodiments, the processing core 102 provides the differential data (in bits) to the transmitter 120 and thus also tracks whether the transceiver as a whole will be in either transmission mode or idle mode. Thus, the processing core 102 can also control the bypass switch 112 with the bypass enable signal (bypass_en) to open or close the bypass switch 112, depending on the mode of operation. Further, in these embodiments, the processing core 102 also causes the voltage output by the transmission driver 122 to swing beyond the low-voltage swing pulses (of the data bits) sufficient to trigger the receiver 150 into or out of the transmission mode.

More specifically, in various embodiments, the receiver 150 includes a voltage swing detector 154 coupled between the input of the receiver 150 (e.g., coupled to the channel 130) and the activation switch 146. In these embodiments, the voltage swing detector 154 detects a voltage swing in the input voltage (e.g., which is also the channel voltage) that satisfies a first threshold value or a second threshold value and causes, in response to the detection, the activation switch 146 to open or close, respectively. In some embodiments, the receiver 150 also includes transition logic 158 coupled between the voltage swing detector 154 and the activation switch 146. In these embodiments, the transition logic 158 is configured to detect a detection signal from the voltage swing detector 154 generated in response to the detection and trigger, in response to the detection signal, the activation switch 146 to open or close, as was just discussed.

In at least some embodiments, the first threshold value is a pull-down voltage (e.g., low threshold value) that is below a lowest voltage of the channel 130 during a transmission mode (see FIG. 2A). Further, in these embodiments, the second threshold value is a pull-up voltage (e.g., a high threshold value) that is above a highest voltage of the channel 130 during the transmission mode (see FIG. 2A). In an alternative set of embodiments, where the logic is reversed, the first threshold value is a pull-up voltage that is above a highest voltage of the channel 130 during a transmission mode. Further, in alternative embodiments, the second threshold value is a pull-down voltage that is below a lowest voltage of the channel 130 during the transmission mode.

In various embodiments, the activation switch 146 being closed causes the receiver 150 to operate in a transmission mode, and when opened, causes the receiver 150 to be deactivated such that the voltage entering the front-end circuit 140 is set to ground or to supply voltage, either of which causes the front-end circuit 140 to not consume direct current. For example, to deactivate the receiver 150, the input voltage may be at zero volts (or ground), so there would be a high voltage (e.g., a logical "1") between the inverters 143 and 144, and a zero voltage again at the receiver output (VRX,out). Otherwise, if the input voltage is high (e.g., a logical "1"), there would be a low voltage (e.g., ground) between the inverters 143 and 144, and the receiver output would be at a high voltage. These scenarios are made possible by the positive feedback path (pfb) in the receiver 150. In either of these scenarios, the circuitry of the front-end circuit 140 ceases consuming direct current.

Figure 2A:
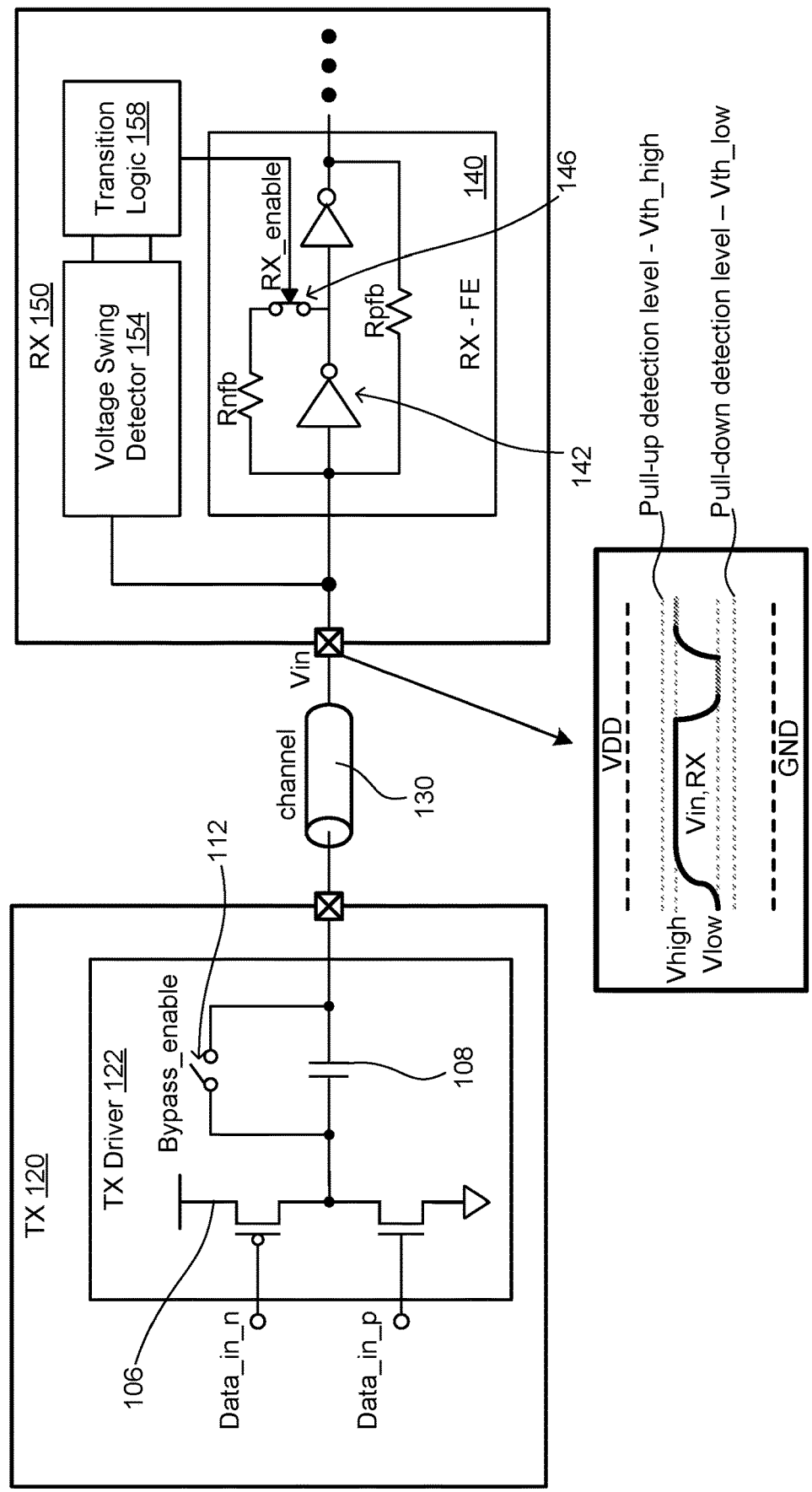
FIG. 2A is a schematic block diagram of the AC-coupled signaling system during a transmission mode, according to at least some embodiments.

FIG. 2A is a schematic block diagram of the AC-coupled signaling system 100 during transmission mode 200A, according to at least some embodiments. This is the operational mode of the transceiver link when valid data is transferred from the transmitter 120 to the receiver 150. In some embodiments, during the transmission mode 200A, the processing core 102 causes the bypass switch 112 to open (or remain open), and the transition logic 158 keeps the activation switch 146 closed, e.g., to keep the receiver 150 active. In these embodiments, data from the transmitter 120 passes through the capacitor 108, and the voltage levels at the receiver input are determined by the DC restoration system (or circuitry) embodied in the front-end circuit 140.

In at least some embodiments, the DC voltage restoration levels are close to the mid-level voltage of the input inverter 143, e.g., ⅓ and ⅔ of supply voltage (VDD), as can be seen in the diagram of various signals between ground (GND) and VDD at Vin,RX (Bpad). Thus, by way of comparison, the pull-up detection level or the high threshold value (Vth_high) is above the Vhigh of the DC restoration levels of the data. Further, the pull-down detection level or the low threshold value (Vth_low) is below the Vlow of the DC restoration levels of the data.

In some embodiments, the DC voltage swing of the receiver 150 is designed to match the AC voltage swing of the transmitter 120 for inter-symbol interference (ISI)-free NRZ signaling. For example, both the DC voltage swing and the AC voltage swing can be designed to be equal to VDD/3. The AC voltage swing can be determined by the capacitive division Cac/(Cac+Cload), where Cac is the capacitance of the capacitor 108, and Cload is the total capacitance of the input and output pads and the channel 130. The voltage-swing-matching design may, therefore, be altered by choosing the capacitance of the capacitor 108 (Cac).

In some embodiments, and with additional reference to FIG. 1A, from a simplified resistive model of the front-end circuit 140, it can be seen that, in order to ensure such DC levels in the Bpad input, the following conditions are sought by proper sizing in the system design according to Equation (1):

$$V_{B_{pad}} = VDD \cdot \frac{R_{pfb} + R_{on,2nd\_stage}}{R_{nfb} + R_{on,1st\_stage}} \approx VDD \cdot \frac{R_{pfb}}{R_{nfb} + R_{on,1st\_stage}} = VDD/3 \quad (1)$$

where the $R_{on,2nd\_stage}$ is the resistance of the second inverter 144 when conducting and $R_{on,1st\_stage}$ is the resistance of the first inverter 143 when conducting. Because the $R_{on,2nd\_stage}$ value is much smaller than the other resistive values, its resistance can be ignored.

Figure 2B:
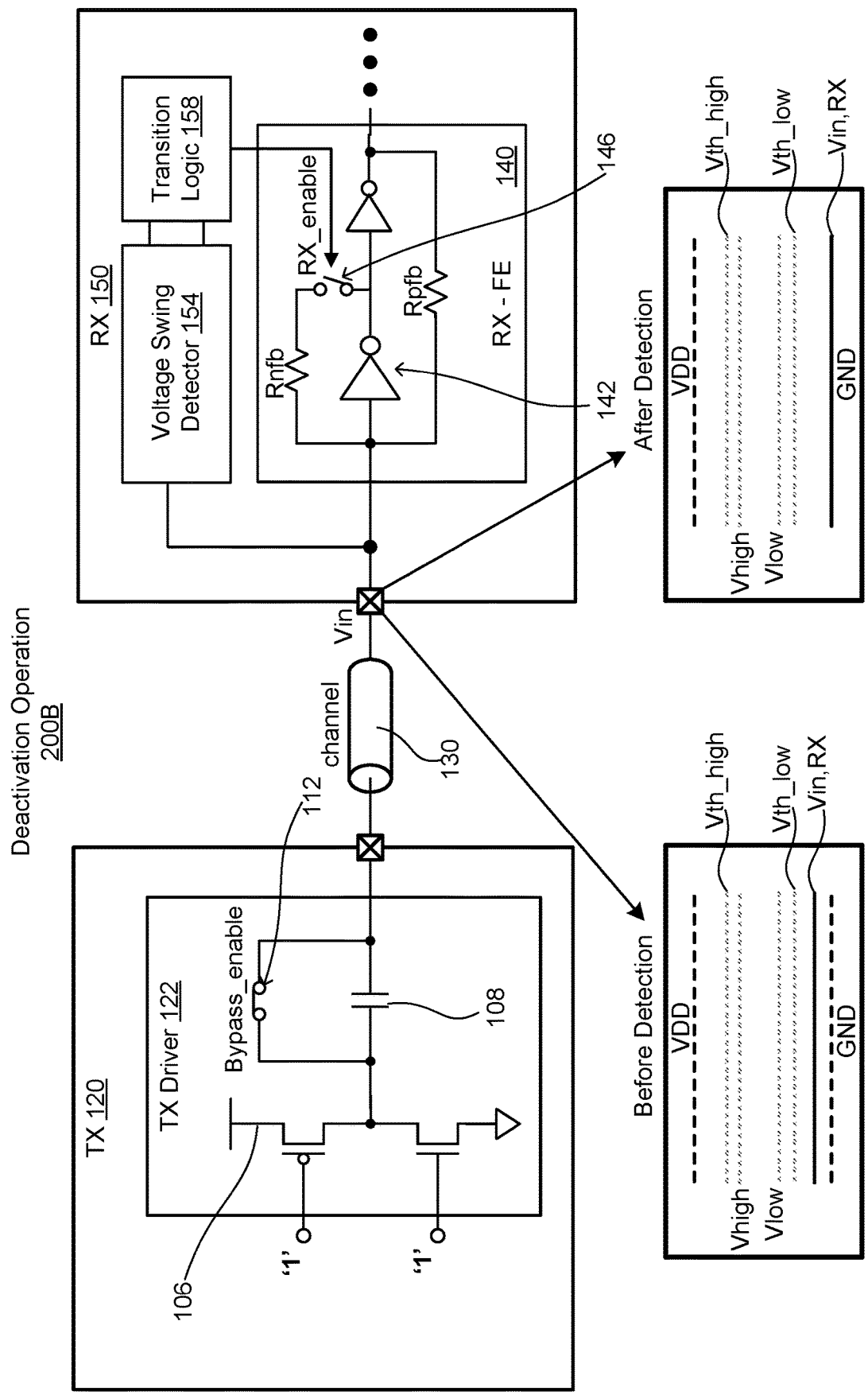
FIG. 2B is a schematic block diagram of the AC-coupled signaling system to perform deactivation of transmission mode, according to at least some embodiments.

FIG. 2B is a schematic block diagram of the AC-coupled signaling system to perform deactivation of a transmission mode, e.g., a deactivation operation 200B, according to at least some embodiments. During the deactivation operation 200B, according to some embodiments, the processing core 102 signals the bypass switch 112 to close (via the bypass_enable signal) and pulls down the voltage in the channel 130 with a hard pull-down voltage. In this way, the input voltage (Vin, RX) to the receiver 150 moves below the low threshold value (Vth_low), as illustrated in the "Before Detection" graph. Specifically, in at least one embodiment, the processing core 102 determines that the transmission driver 122 is to exit the transmission mode, causes the bypass switch 112 to be closed, and triggers the transmission driver 122 to cause the voltage of the channel 130 to at least satisfy the first threshold value, e.g., the Vth_low value.

In these embodiments, the voltage level at the receiver 150 is determined by the impedance relation between the transmitter 120 and receiver 150. By design, the voltage level at the receiver input drops below the detection level of the pull-down detector, e.g., in some embodiments, ⅙ of supply voltage, which can be considered a "hard pull-down." For example, the impedance of the transmitter 120 (or transmission driver 122) can be chosen to be small enough such that the ratio between the transmitter impedance and the receiver impedance causes the Bpad input signal to drop lower than the Vth_low detection level during a hard pull-down.

In various embodiments, detection of the hard pull-down shutoff of the DC restoration circuitry in the front-end circuit 140 an thus shuts off the direct current (DC) in the receiver 150, as discussed previously. In some embodiments, the DC restoration circuitry includes the illustrated components of the front-end circuit 140. In these embodiments, this hard pull-down causes the input voltage of the receiver 150 to drop to ground supply level (GND), as illustrated in the "After Detection" graph. As mentioned, however, in alternative embodiments, the hardware design can be inverted so that the receiver 150 is instead responsive to a hard pull-up in this situation. In the illustrated case, however, the voltage over the Bpad input may be expressed as:

$$V_{B_{pad},pulldown} = VDD \cdot \frac{R_{pfb}\|R_{on,TX}}{R_{nfb} + R_{on,1st\_stage} + R_{pfb}\|R_{on,TX}} \approx VDD \cdot \frac{R_{pfb}\|R_{on,TX}}{R_{nfb} + R_{on,1st\_stage}}, \quad (2)$$

Where $R_{on,TX}$ is the impedance of the transmitter 120. The last approximation in equation (2) is since $R_{pfb}\|R_{on,TX} \ll R_{nfb}+R_{on,1st\_stage}$. The difference between Equation (2) (with the TX hard pull-down) and Equation (1) (without the TX hard pull-down) is the numerator. In Equation (2), for example, the addition of $R_{on,TX}$ in parallel to Rpfb, makes the numerator smaller compared to Equation (1), hence lowering the Bpad voltage.

Figure 2C:
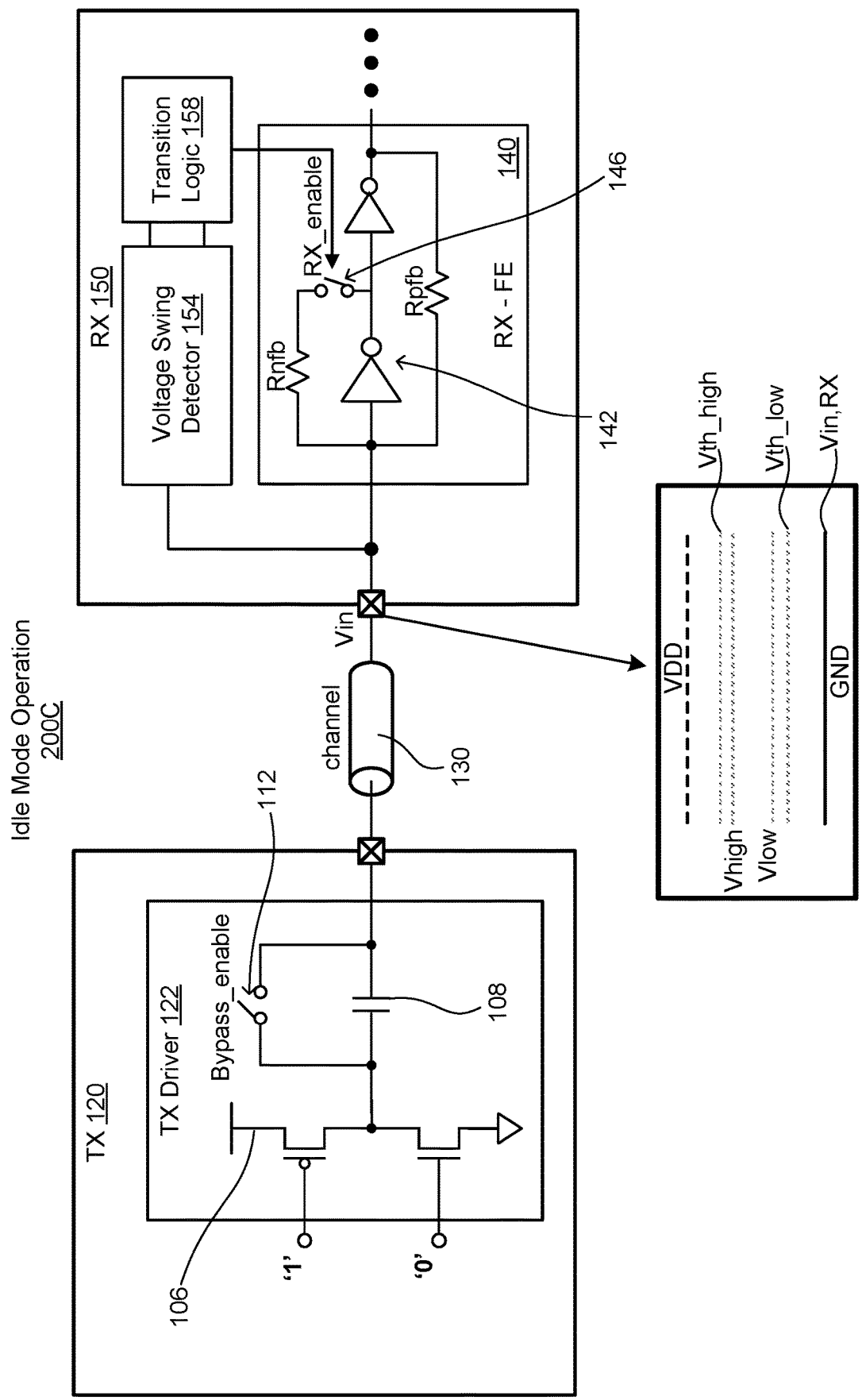
FIG. 2C is a schematic block diagram of the AC-coupled signaling system during idle mode, according to at least some embodiments.

FIG. 2C is a schematic block diagram of the AC-coupled signaling system 100 during idle mode, e.g., an idle mode operation 200C, according to at least some embodiments. In various embodiments, during idle mode, the processing core 102 causes the bypass switch 112 to open, and the transmission driver 122 is put in a state of high-impedance (high-Z) by causing a logical '1' and '0,' respectively, to be input to the p-type and n-type transistors of inverter 106, thus relaxing the transmission driver 122. The voltage level at the receiver input remains at ground supply (GND) since the DC restoration is still deactivated. This idle mode may be used to mitigate transistor degradation of the transmitter 120, e.g., by avoiding placement of the transistors in a pull-down state for a long time and any resultant premature aging of the transistors.

Figure 2D:
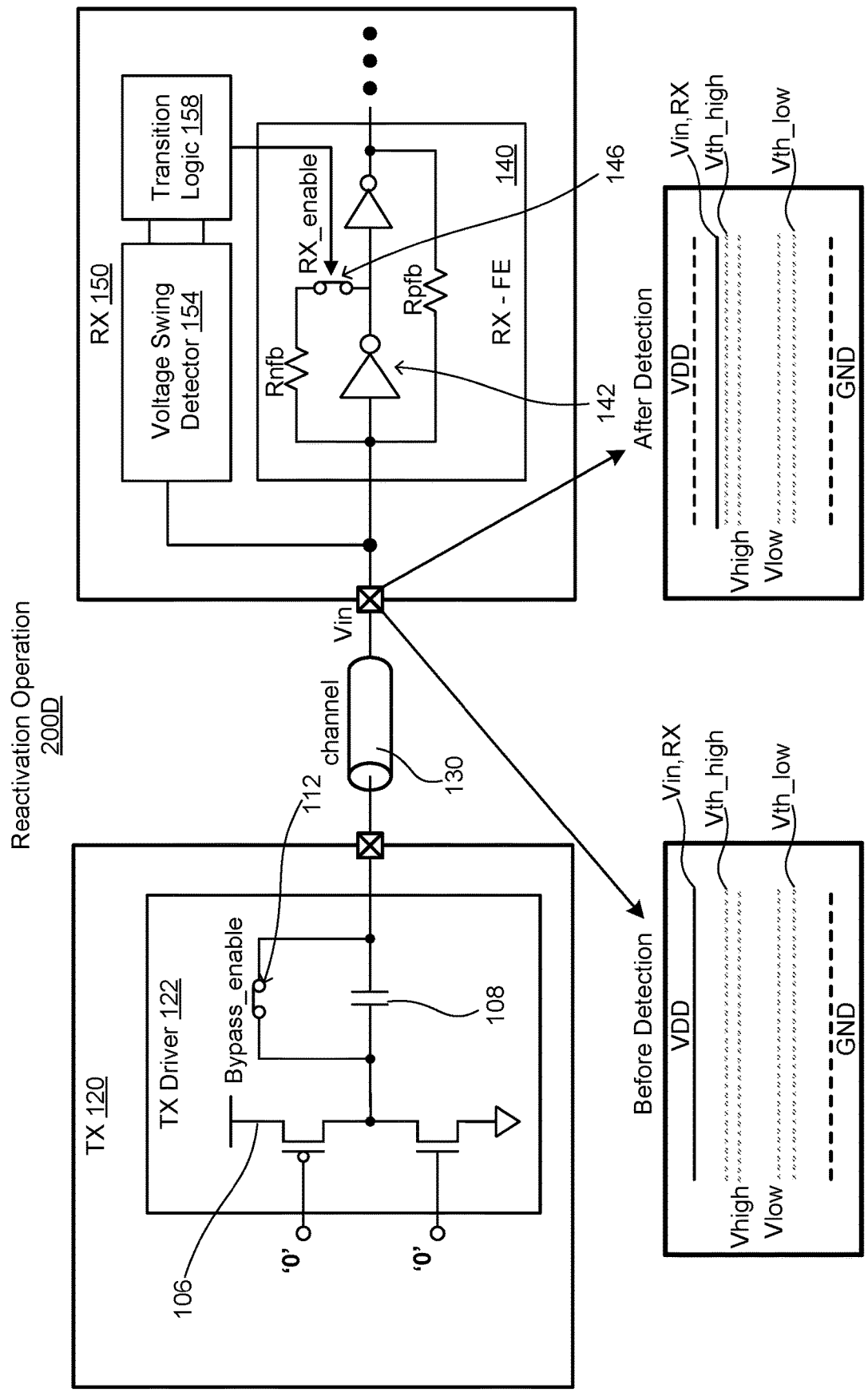
FIG. 2D is a schematic block diagram of the AC-coupled signaling system to perform reactivation back into transmission mode, according to at least some embodiments.

FIG. 2D is a schematic block diagram of the AC-coupled signaling system 100 to perform reactivation back into transmission mode, e.g., a reactivation operation 200D, according to at least some embodiments. In this reactivation operation 200D, the processing core 102 signals the bypass switch 112 to close (via the bypass_enable signal), and thus to bypass the series capacitor 108. In these embodiments, the transmitter 120 further pulls up the channel voltage. Specifically, in at least one embodiment, the processing core 102 determines that the transmission driver 122 is to enter a transmission mode, causes the bypass switch 112 to be closed, and triggers the transmission driver 122 to cause the voltage of the channel 130 to at least satisfy the high threshold value. In these embodiments, the voltage level at the receiver input reaches the supply level (VDD) because the DC restoration circuitry is still deactivated, as illustrated in the "Before Detection" graph.

At this point, according to some embodiments, the voltage swing detector 154 detects a hard pull-up, e.g., a voltage in the channel 130 that satisfies (e.g., meets or exceeds) the high threshold voltage value (Vth_high). In these embodiments, this detection reactivates the DC restoration operation of the receiver 150, which was previously discussed. Now the voltage level at the receiver input is once again determined by the impedance relation between the transmitter 120 and the receiver 150. At this stage, the voltage over the Bpad input may be expressed as:

$$V_{B_{pad},pullup} = VDD \cdot \frac{R_{nfb} + R_{on,1st_{stage}}}{R_{nfb} + R_{on,1st_{stage}} + R_{pfb}\|R_{on,TX}} \quad (3)$$

since $R_{pfb}\|R_{on,TX} \ll R_{nfb}+R_{on,1st\_stage}$, this voltage level is close to the supply voltage level. Next, according to these embodiments, the processing core 102 signals the bypass switch 112 to open (be switched off) again, and the voltage level at the receiver input returns to the high level of the transmission mode operation 200A (see FIG. 2A), thus fully reactivating the receiver 150. As discussed, it is possible to invert this hardware design so that the receiver 150 is instead responsive to a hard pull-down in this situation.

Figure 3A:
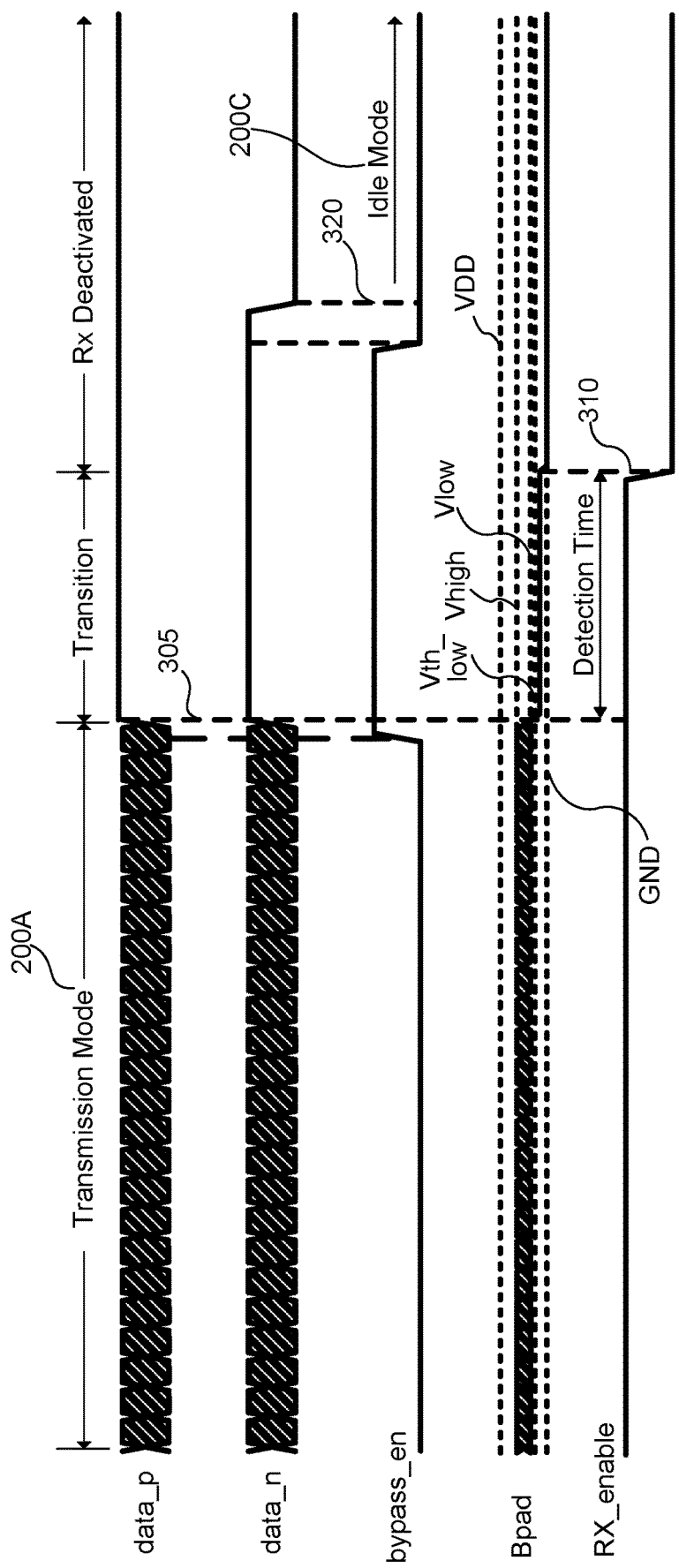
FIG. 3A is a set of signal timing diagrams associated with transmission deactivation (FIGS. 2A-2B), according to various embodiments.

FIG. 3A is a set of signal timing diagrams associated with transmission deactivation (FIGS. 2A-2B), according to various embodiments. In this set of diagrams, it can be seen that, before the deactivation, the transmission driver 122 is in transmission mode and transmits live data (data_p, data_n). At a time point 305, the bypass_en signal is raised to logical '1' (e.g., is asserted), and both inputs to the transmission driver 122 (data_p, data_n) are set to logical '1.' Consequently, the voltage at the Bpad input drops below the low threshold value (Vth_low). Thus, at time point 305, the transmitter 120 stops transmitting live data and is configured to pull-down the channel voltage, which is a way to indicate to the receiver 150 that the transmitter 120 is going into idle mode. For example, satisfying the low threshold voltage value triggers the voltage swing detector 154 and transition logic 158 to open the activation switch 146.

Figure 6A:
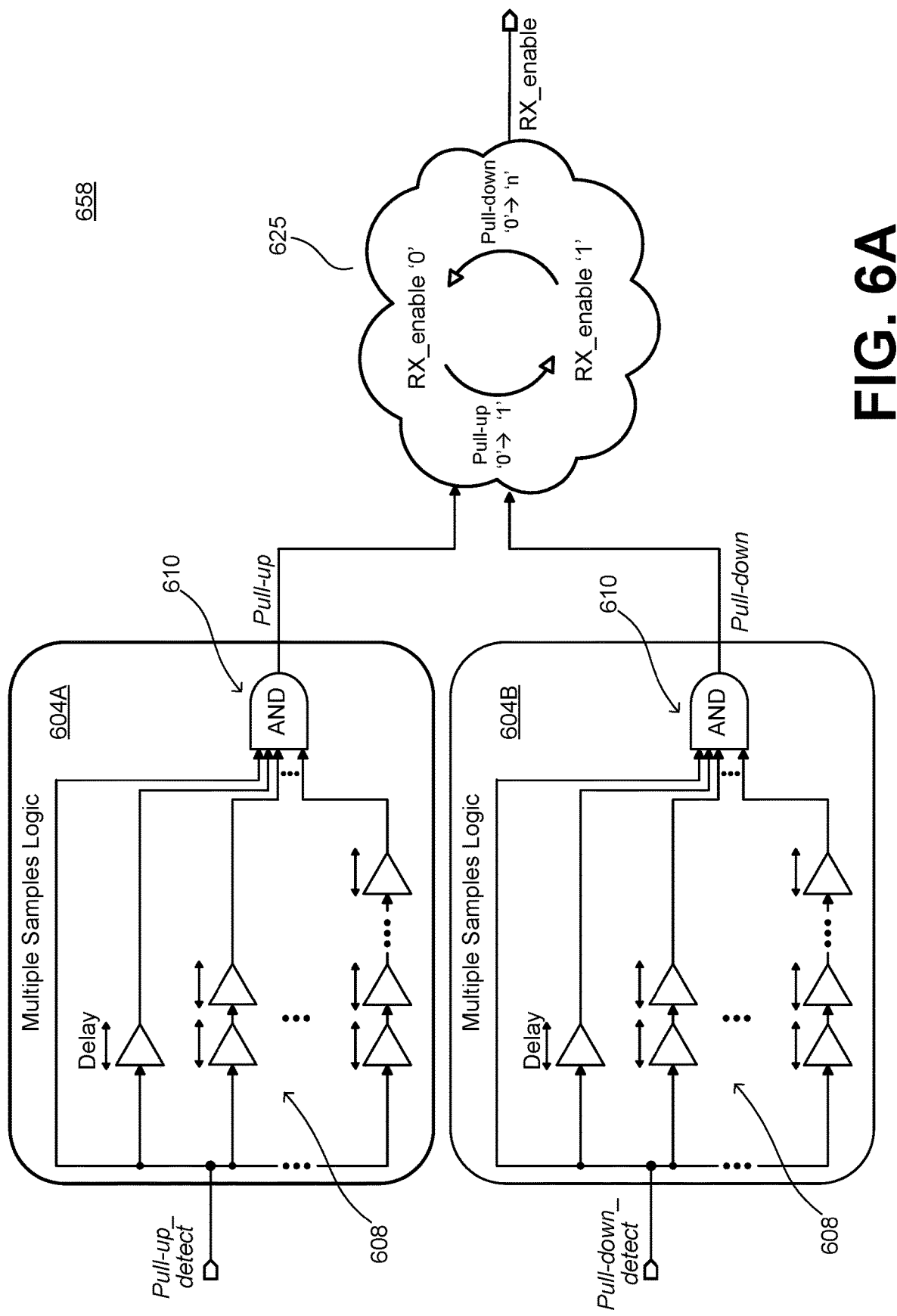
FIG. 6A is a schematic diagram of transition logic according to at least one embodiment.
Figure 6B:
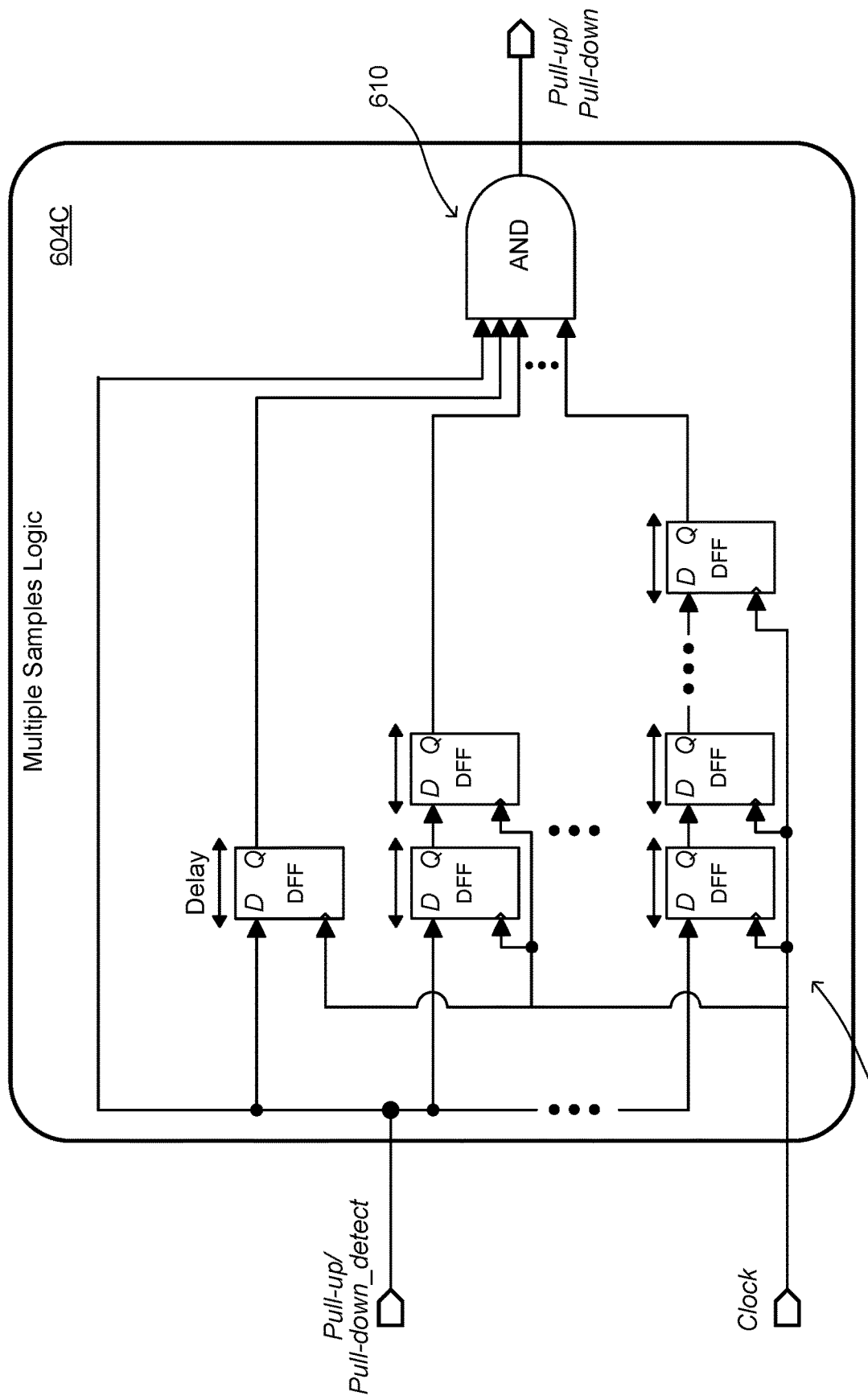
FIG. 6B is a schematic diagram of multiple samples logic of FIG. 6A according to at least another embodiment.

In these embodiments, after a delay of "detection-time," the transition logic 158 lowers the RX_enable signal to '0' (e.g., de-asserted), disabling the receiver 150 as of time point 310. In some embodiments, the deactivation time is the time required for the voltage swing detector 154 to detect the crossing of the Vth_low/Vth_high plus the time it takes to the transition logic 158 to switch states, e.g., change the RX_enable signal as illustrated in FIGS. 6A-6B by way of example. The time period that the bypass_en signal is at logical '1' may be predefined in the transmitter 120 (e.g., programmed to the processing core 102) and should be larger than the "detection time" of the activation/deactivation hardware. After time point 310, in these embodiments, the DC-restoration mechanism is disabled, and the voltage over Bpad drops to ground. After an additional delay, which is larger than the "detection time," the voltage swing detector 154 and transition logic 158 lower the bypass_en signal to a logical '0.' After an additional short amount of delay, at time point 320, the data_n input to the transmission driver 122 is lowered to logical '0,' making the transmission driver 122 enter high-impedance or idle mode operation 200C. These additional delays may be predefined in the processing core 102.

Figure 3B:
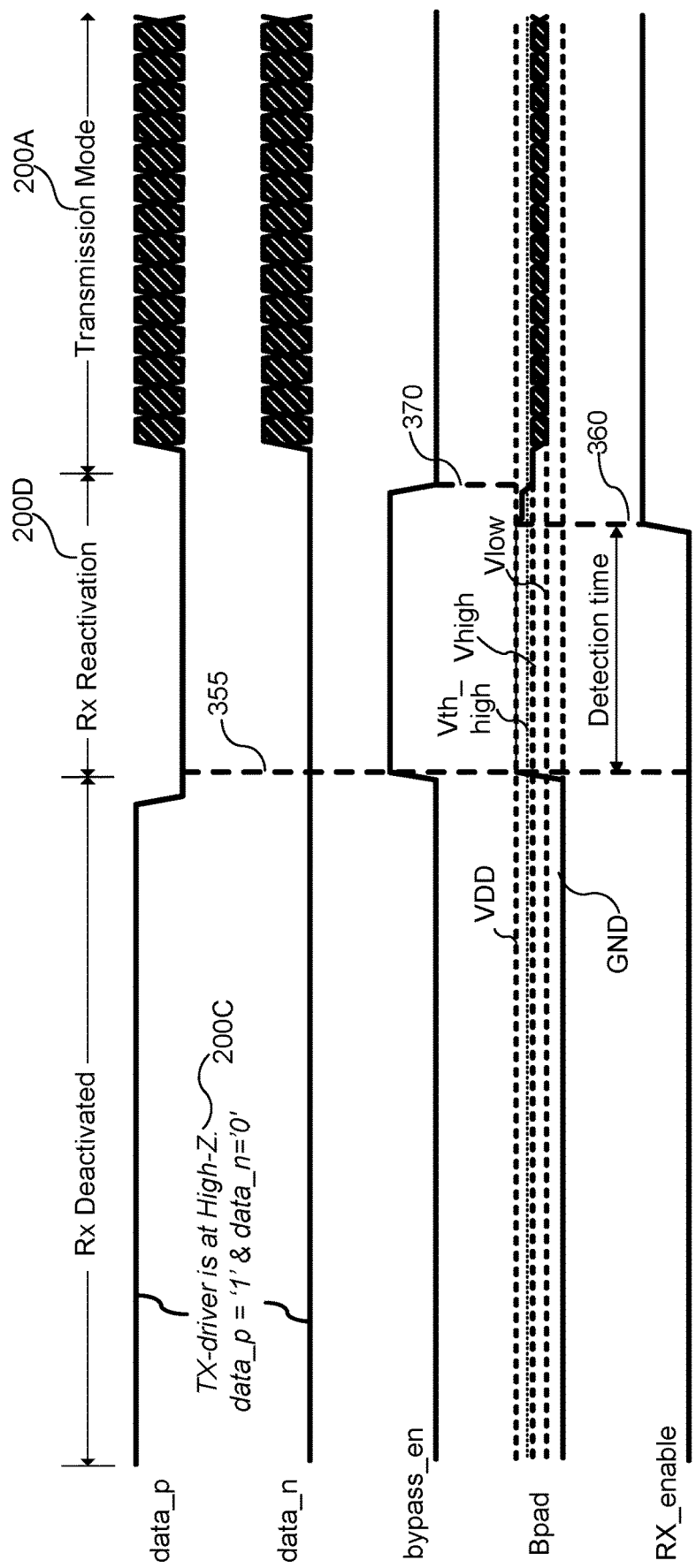
FIG. 3B is a set of signal timing diagrams associated with transmission reactivation (FIG. 2D and FIG. 2A), according to various embodiments.

FIG. 3B is a set of signal timing diagrams associated with transmission reactivation (FIG. 2D and FIG. 2A), according to various embodiments. It can be seen that, before the reactivation, the transmission driver 122 is in high impedance (or idle) mode operation 200C. At a time point 355, the processing core 102 raises the bypass_en signal to logical '1' (e.g., asserted) and sets both inputs to the transmission driver 122 (data_p and data_n) to logical '0,' e.g., de-asserted. Consequently, the input voltage at the Bpad is raised to VDD and above the high threshold value (Vth_high) threshold. In these embodiments, as the receiver 150 and its DC restoration circuitry are disabled at this stage when the bypass_en is at logical '0,' or de-asserted, the transmission driver 122 charges the Bpad voltage input to VDD.

In various embodiments, the Bpad voltage input going to VDD triggers the voltage swing detector 154 and the transition logic 158, which after a delay of "detection-time," at time point 360, raises the RX_enable signal to logical '1,' reactivating the receiver 150. At this point, the DC restoration mechanism of the receiver 150 starts to work, and the voltage at Bpad drops a bit but is still higher than the Vth_high threshold value. After an additional delay, which should be larger than the "detection time," at a time point 370, the processing core 102 lowers the bypass_en signal to logical '0.' After this point, the transmission driver 122 can enter transmission mode operation 200A. After an additional short amount of delay, the transmission driver 122 starts transmitting live data again. These additional delays may be predefined in the processing core 102.

Figure 4A:
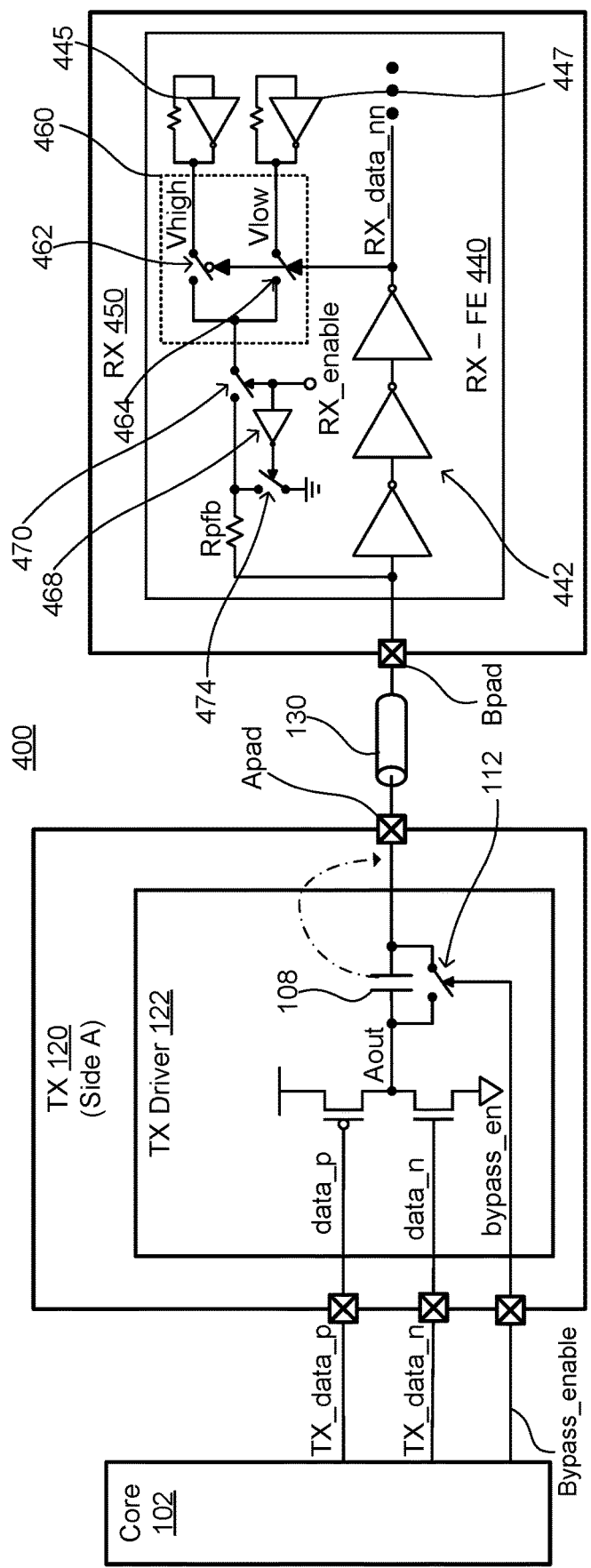
FIG. 4A is a schematic block diagram of an example AC-coupled signaling system that employs analog multiplexer selection to implement DC restoration, according to at least some embodiments.

FIG. 4A is a schematic block diagram of an example AC-coupled signaling system 400 that employs analog multiplexer selection to implement DC restoration, according to at least some embodiments. Compared to the AC-coupled signaling system 100, the AC-coupled signaling system 400 differs in implementation of the front-end circuit. For example, the system 400 instead includes a receiver 450 having a front-end circuit 440 that employs analog multiplexer selection to implement DC restoration.

Specifically, in at least some embodiments, the front-end circuit 440 includes a series of inverters 442 at the input (e.g., coupled to the Bpad input) of the receiver 450, and an analog multiplexer 460 connected inline in a positive feedback loop, e.g., coupled to the Rpfb resistor and back to the input of the series of inverters 442. In some embodiments, the front-end circuit 440 includes a first activation switch 470 also connected inline in the positive feedback loop, e.g., coupled to the analog multiplexer 460. In some embodiments, the front-end circuit 440 includes a second activation switch 474 coupled between the positive feedback loop (e.g., adjacent to Rpfb) and ground. A further inverter may be coupled between the RX_enable signal going to the first activation switch 470 and the second activation switch 474, thus inverting the RX_enable signal to the second activation switch 474. In this way, the opposing logical value of the RX_enable signal is employed (e.g., when the RX_enable signal is de-asserted or '0') to force the input value at Bpad and to the series of inverters 442 to either logical zero ('0'), where, as illustrated, the second activation switch 468 is coupled to ground, or to a logical one ('1') where, as not illustrated, the second activation switch 468 is instead coupled to VDD.

According to at least some embodiments, the analog multiplexer 460 includes a first switch 462 that is selectable in response to an output (RX_data_nn) of the series of inverters 442 being a high voltage (e.g., a logical '1' value) and a second switch 464 that is selectable in response to the output (RX_data_nn) of the series of inverters 442 being a low voltage (e.g., a logical '0' value). In these embodiments, the front-end circuit 440 further includes a high-voltage skewed inverter 445 coupled to the first switch 462 and configured to send the high voltage back to the input of the series of inverters 442, thus boosting the input voltage to a stronger and restored DC high value of logical '1.' Similarly, in these embodiments, the front-end circuit 440 further includes a low-voltage skewed inverter 447 coupled to the second switch 464 and configured to send the low voltage back to the input of the series of inverters 442, thus reducing the input voltage towards ground as a restored DC low value of logical '0.' In this way, the DC voltage input detected by the front-end circuit 440 is strengthened to create a clearer output voltage (RX_data_nn) of the front-end circuit 440 corresponding to a logical value of a bit being either a zero ('0') or a one ('1').

Figure 4B:
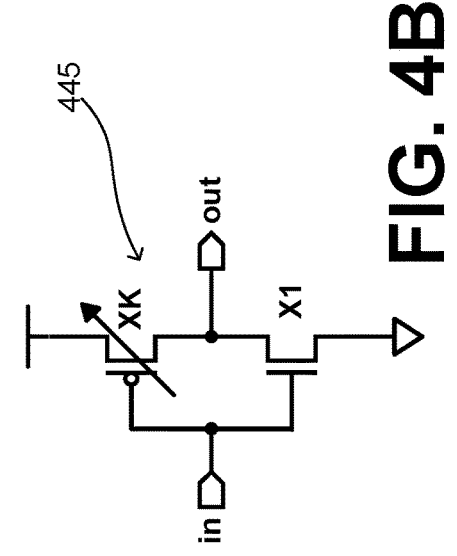
FIG. 4B is a schematic diagram of a high-voltage skewed inverter that generates a high voltage for the analog multiplexer selection, according to an embodiment.
Figure 4C:
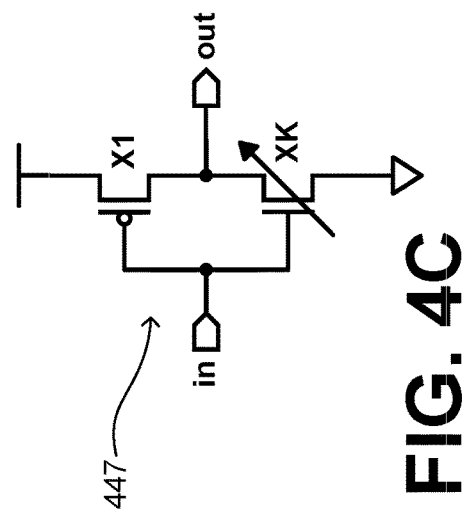
FIG. 4C is a schematic diagram of a low-voltage skewed inverter that generates a low voltage for the analog multiplexer selection, according to an embodiment.

Further, in at least some embodiments of FIGS. 4A-4C, although not illustrated, the voltage swing detector 154 and transition logic 158 are coupled as illustrated in FIG. 1A, but now from the input of the series of inverters 442 to the first activation switch 470, e.g., with an output being the RX_enable signal. Thus, the disclosure of FIGS. 1A-1B associated with the voltage swing detector 154 and the transition logic 158 are likewise applicable to the analog multiplexer architecture of FIG. 4A.

As illustrated in FIG. 4B, the high-voltage skewed inverter 445 can include a drain-connected p-type transistor (XK) and n-type transistor (X1) in which the p-type transistor is variable based on the input voltage (RX_data_nn). Further, as illustrated in FIG. 4C, the low-voltage skewed inverter 447 can include a drain-coupled p-type transistor (X1) and n-type transistor (XK) in which the n-type transistor is variable based on the input voltage (RX_data_nn). In some embodiments, the high voltage (e.g., for the logical '1') generated by the high-voltage skewed inverter 445 and the low voltage (e.g., for the logical '0') generated by the low-voltage skewed inverter 447 are configurable based on the ratio in channel size between the p-type inverters and the n-type inverters, which in at least some embodiments, are composed of complementary metal-oxide semiconductor (CMOS) transistors.

Figure 5A:
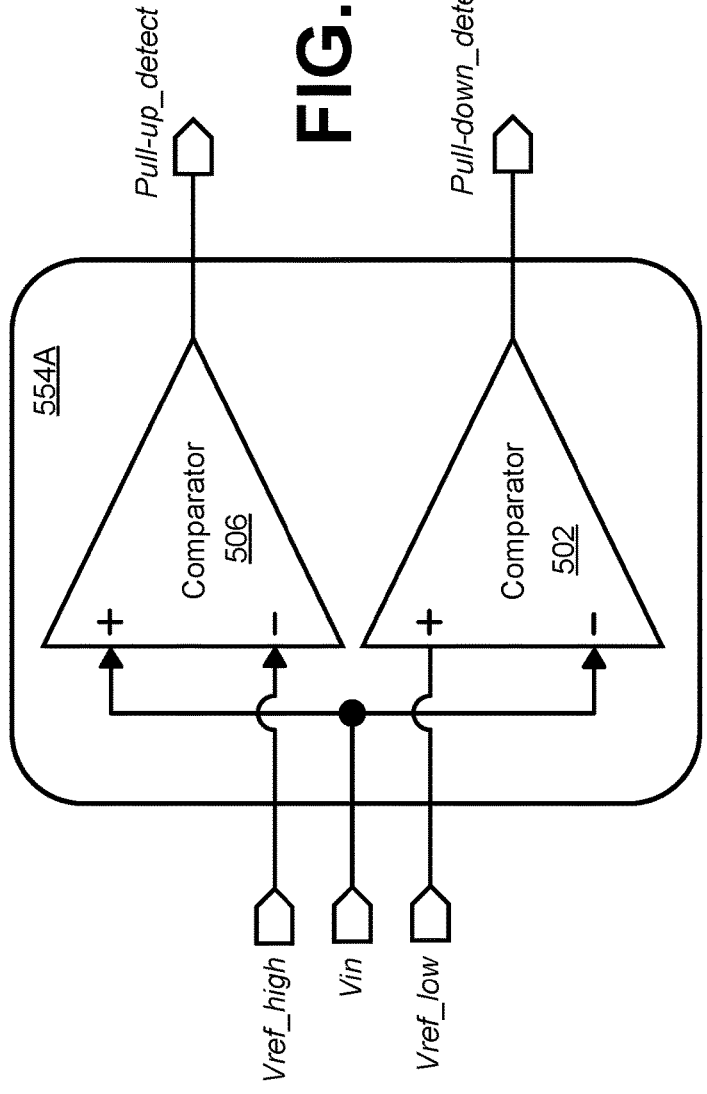
FIG. 5A is a schematic diagram of a voltage swing detector (FIG. 1A) according to at least one embodiment.

FIG. 5A is a schematic diagram of a voltage swing detector 554A (FIG. 1A) according to at least one embodiment. In some embodiments, the voltage swing detector 554A is the voltage swing detector 154 of FIG. 1A. In these embodiments, the voltage swing detector 554A includes a first comparator 502 to compare the input voltage (Vin at Bpad) with a low reference voltage (Vref_low) to detect the low threshold value (Vth_low). In some embodiments, in response to a positive detection of satisfying the low reference voltage, the first comparator 502 outputs a pull-down detection signal (pull-down_detect) to detection logic, e.g., to the detection logic 158 (FIG. 1A). Further, in these embodiments, the voltage swing detector 554A includes a second comparator 506 to compare the input voltage (Vin at Bpad) with a high reference voltage (Vref_high) to detect the second threshold value (Vth_high). In some embodiments, in response to a positive detection of satisfying the high reference voltage, the second comparator 506 outputs a pull-up detection signal (pull-down_detect) to detection logic, e.g., to the detection logic 158 (FIG. 1A).

Figure 5B:
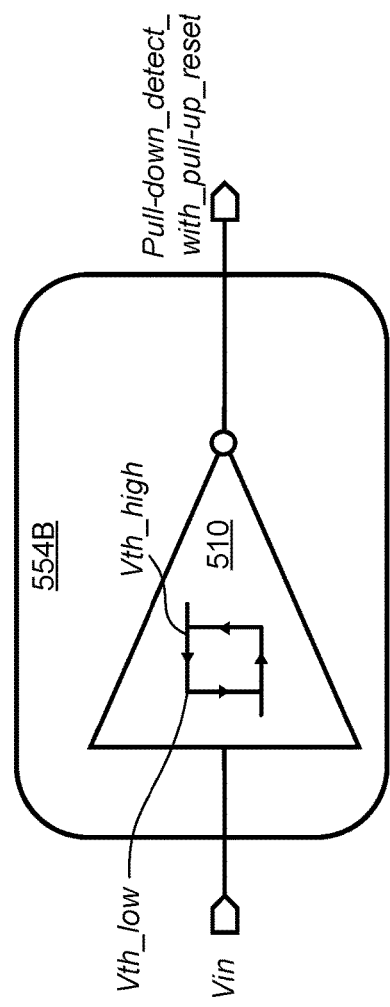
FIG. 5B is a schematic diagram of a voltage swing detector (FIG. 1A) according to at least another embodiment.

FIG. 5B is a schematic diagram of a voltage swing detector 554B (FIG. 1A) according to at least another embodiment. In some embodiments, the voltage swing detector 554B is the voltage swing detector 154 of FIG. 1A. In these embodiments, the voltage swing detector 554B includes a Schmitt trigger inverting comparator 510 with a low threshold voltage to be compared with the low threshold value (Vth_low) and a high threshold voltage to be compared with the high threshold value (Vth_high).

More specifically, in these embodiments, when the input voltage (Vin at Bpad) is below Vth_low, the output (Pull-down_detect_with_pull-up_reset) is a logical one ('1'). Further, in these embodiments, when the input voltage is higher than Vth_high, the output is a logical zero ('0'). In these embodiments, however, when the input voltage is between Vth_low and Vth_high levels, the output retains its value, meaning that the output depends on which direction the input voltage has changed. For example, if the input voltage (Vin) was below Vth_low, the output was a logical '1,' and when the input voltage increased and became larger than Vth_low, the output stayed at a logical '1.' In these embodiments, furthermore, when the input voltage becomes higher than Vth_high, the output changes to a logical zero '0.'

In various embodiments, when used as the swing voltage detector 154 or 554B, and when the Schmitt trigger comparator 510 detects a pull-down, the Schmitt trigger comparator 510 outputs a logical '1.' Further, in these embodiments, only when the Schmitt trigger comparator 510 detects a voltage pull-up, does the Schmitt trigger comparator 510 output a logical '0,' which changes the output voltage, referred to as "reset." The other direction is also true, if the input voltage was higher than Vth_high, and the output was a logical '0' when the input voltage has decreased to lower than Vth_high, the output stays at a logical '0.' Only when the input voltage (Vin) becomes lower than Vth_low, does the output change to logical '1.' Thus, in these embodiments, when the Schmitt trigger comparator 510 detects a pull-up in the input voltage, the Schmitt trigger comparator 510 output is reset to logical '0.' Only when a pull-down is detected does the Schmitt trigger comparator 510 output change back to a logical '1.'

Thus, according to some embodiments, by using the Schmitt trigger comparator 510, the voltage swing detector 554B output is set to '1' when the transmitter 120 is in pull-down-mode and reset back to '0' only when the transmitter 120 is in pull-up-mode. Together with the transition logic 158, this output may indicate whether the DC restoration circuitry (e.g., of the front-end circuit 140 or 440) will be activated or deactivated. If pull-down has been detected, the DC restoration circuitry will be deactivated, and only when a pull-up is detected, will the DC restoration circuitry be reactivated.

In some embodiments, with reference to FIGS. 6A-6B, because the ISR-ACT parallel interface uses a single-ended signaling scheme and because there can be a large simultaneous switching noise (SSN) due to the many transceivers operating simultaneously in parallel, the signal on the input pad (Bpad) to the receiver 150 or 450 can suffer from significant noise and interferences. Due to the fact that the voltage swing detector 154 (e.g., see FIGS. 5A-5B) compares the input signal to threshold values and decides, based on these values, whether the transmitter is pulling the channel voltage down or up, there is a need protect against false-detection of satisfying the threshold values (Vth_low or Vth_high) and incorrectly deactivating (or reactivating) the receiver 150 or 450. Wrong activation of the receiver enables unwanted DC to flow again in the receiver 150 or 450, and wrong deactivation of the receiver risks not transmitting data (or at least delayed reactivation to be able to again transmit live data).

The current disclosure addresses these deficiencies by, in some embodiments, the transition logic 158 generating a plurality of samples of the detection signal (received from the voltage swing detector 154) at different time instances. In these embodiments, the transition logic further performs an AND operation of the plurality of samples to prevent false detection of the voltage swing that satisfies either the low threshold value (Vth_low) or the high threshold value (Vth_high).

FIG. 6A is a schematic diagram of transition logic 658 according to at least one embodiment. In some embodiments, the transition logic 658 is the transition logic 158 of FIG. 1A. In the embodiment of FIG. 6A, the transition logic 658 includes first multiple samples logic 604A to sample a pull-up detection signal (pull-up_detect) and second multiple samples logic 604B to sample a pull-down detection signal (pull-down_detect). Each of the first multiple samples logic 604A and the second multiple samples logic 604B may include a plurality of series-connected sets of buffers 608 that cause different sequential delays to generate a plurality of samples at different time instances while still being output, and thus comparable, at the same time. In one embodiment, the plurality of samples are input to an AND gate 610, such that if even one sample is incorrect, the AND gate 610 does not assert an output.

In some embodiments, the first multiple samples logic 604A and the second multiple samples logic 604B are followed by state machine logic 625 that controls the RX_enable output signal according to the transition in the input signals, thus controlling deactivation or reactivation of the receiver 150 or 450. In these embodiments, when the "pull-down" input is set to '1,' the RX_enable output is set to '0.' In contrast, when the "pull-up" input is set to '1', the RX_enable output is set to '1.'

FIG. 6B is a schematic diagram of multiple samples logic 604C, which represents another way to implement either of the first multiple samples logic 604A and the second multiple samples logic 604B (FIG. 6A) according to at least another embodiment. In this embodiment, the plurality of series-connected sets of buffers 608 are replaced with a plurality of series-connected sets of flip-flops 609, where each flip-flop includes and is controlled by a clock input. In this embodiment, the cycle time of the clock determines the delay of each flip-flop, and thus of each series-connected set of flip-flops.

FIG. 7 is a flow chart of an example method 700 for operating an AC-coupled signaling system according to various embodiments. The method 700 can be performed by processing logic comprising hardware, software, firmware, or any combination thereof. For example, the method 700 can be performed by the system 100 or the system 400 (see FIG. 1A and FIG. 4A). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic (e.g., processing core 102) determines that the transmission driver 122 is to one of exit or enter a transmission mode.

At operation 720, the processing logic (e.g., processing core 102) triggers the transmission driver 122 to cause a voltage of the channel 130 to at least satisfy one of a first threshold value or a second threshold value, respectively.

At operation 730, the processing logic (e.g., the voltage swing detector 154) detects a voltage swing in the voltage of the channel that satisfies one of the first threshold value or the second threshold value, respectively.

At operation 740, the processing logic (e.g., the front-end circuit 140 or 440) causes, in response to detecting the voltage swing, the activation switch 146 or 470 to one of open or close, respectively.

Figure 8:
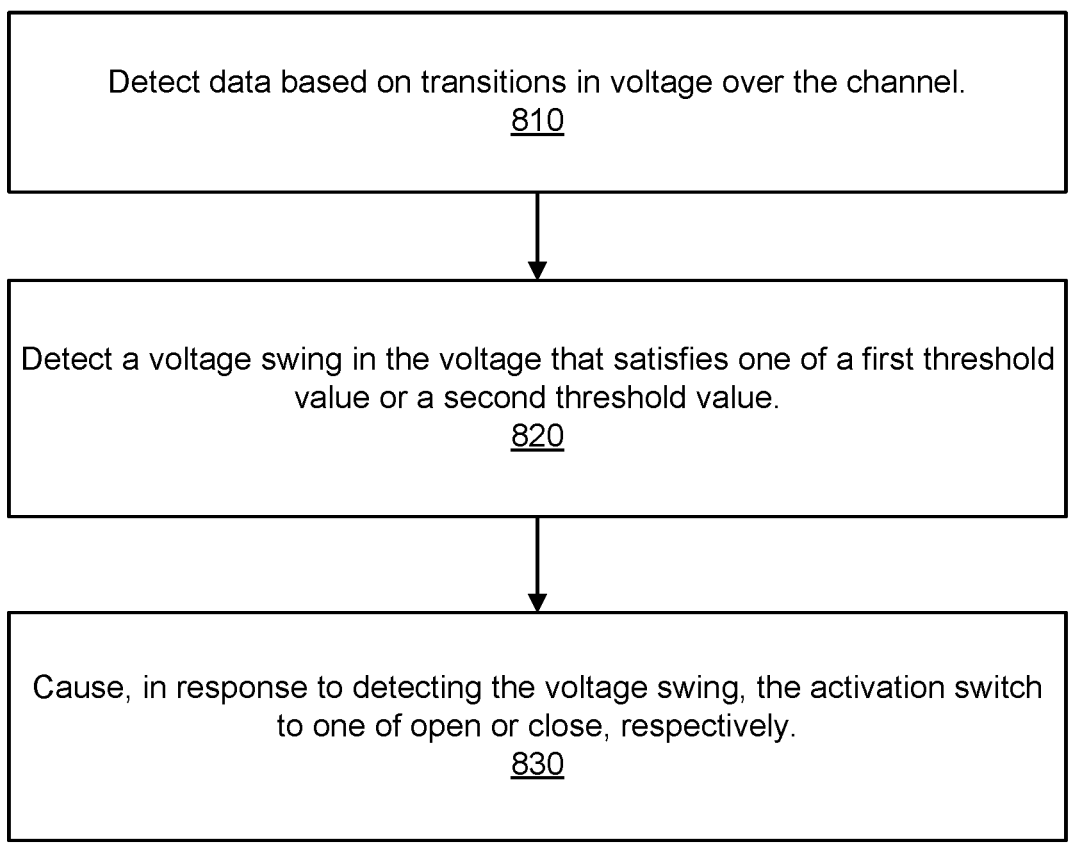
FIG. 8 is a flow chart of an example method for operating an AC-coupled receiver according to some embodiments.

FIG. 8 is a flow chart of an example method 800 for operating an AC-coupled receiver according to some embodiments. The method 800 can be performed by processing logic comprising hardware, software, firmware, or any combination thereof. For example, the method 800 can be performed by the receiver 150 or 450 (see FIG. 1A or FIG. 4A). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic detects data based on transitions in voltage over the channel.

At operation 820, the processing logic detects a voltage swing in the voltage that satisfies one of a first threshold value or a second threshold value.

At operation 830, the processing logic causes, in response to detecting the voltage swing, the activation switch to one of open or close, respectively.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A system comprising:
   a transmission driver coupled to a channel;
   a capacitor coupled in series to the channel; and
   a receiver coupled to the channel, the receiver comprising:
      a front-end circuit to detect, as data, transitions in voltage over the channel, the front-end circuit including an activation switch; and
      a voltage swing detector coupled between the channel and the activation switch, the voltage swing detector to:
         detect a voltage swing in the voltage that satisfies one of a first threshold value or a second threshold value; and
         cause, in response to the detection, the activation switch to one of open or close, respectively.

2. The system of claim 1, wherein the activation switch, when closed, causes the receiver to operate in a transmission mode and, when opened, causes the receiver to be deactivated such that the voltage entering the front-end circuit is set to ground or to supply voltage, causing the front-end circuit to not consume direct current.

3. The system of claim 1, wherein the receiver further comprises logic coupled between the voltage swing detector and the activation switch, the logic configured to:
   detect a detection signal from the voltage swing detector generated in response to the detection; and
   trigger, in response to the detection signal, the activation switch to one of open or close.

4. The system of claim 3, wherein the logic is further configured to:
   generate a plurality of samples of the detection signal at different time instances; and
   perform an AND operation of the plurality of samples to prevent false detection of the voltage swing.

5. The system of claim 1, wherein
   the first threshold value is a pull-down voltage that is below a lowest voltage of the channel during a transmission mode; and
   the second threshold value is a pull-up voltage that is above a highest voltage of the channel during the transmission mode.

6. The system of claim 1, wherein
   the first threshold value is a pull-up voltage that is above a highest voltage of the channel during a transmission mode; and
   the second threshold value is a pull-down voltage that is below a lowest voltage of the channel during the transmission mode.

7. The system of claim 1, wherein the transmission driver comprises the capacitor and a bypass switch coupled across the capacitor, the system further comprising a processing core coupled to the transmission driver, the processing core configured to:
  determine that the transmission driver is to exit a transmission mode;
  cause the bypass switch to be closed; and
  trigger the transmission driver to cause the voltage of the channel to at least satisfy the first threshold value.

8. The system of claim 7, wherein, after triggering the transmission driver, the processing core is further to cause the bypass switch to be opened.

9. The system of claim 1, wherein the transmission driver comprises the capacitor and a bypass switch coupled across the capacitor, the system further comprising a processing core coupled to the transmission driver, the processing core configured to:
  determine that the transmission driver is to enter a transmission mode;
  cause the bypass switch to be closed; and
  trigger the transmission driver to cause the voltage of the channel to at least satisfy the second threshold value.

10. The system of claim 9, wherein, after triggering the transmission driver, the processing core is to cause the bypass switch to be opened.

11. The system of claim 1, wherein the voltage swing detector comprises:
  a first comparator to compare the voltage with a low reference voltage to detect the first threshold value; and
  a second comparator to compare the voltage with a high reference voltage to detect the second threshold value.

12. The system of claim 1, wherein the voltage swing detector comprises a Schmitt trigger inverting comparator with a low threshold voltage to be compared with the first threshold value and a high threshold voltage to be compared with the second threshold value.

13. A method of operating a system comprising a processing core coupled to a transmission driver, a capacitor coupled between the transmission driver and a channel, a receiver coupled to the channel and comprising a front-end circuit including an activation switch and a voltage swing detector coupled between the channel and the activation switch, the method comprising:
  determining, by the processing core, that the transmission driver is to one of exit or enter a transmission mode;
  triggering, by the processing core, the transmission driver to cause a voltage of the channel to at least satisfy one of a first threshold value or a second threshold value, respectively;
  detecting, by the voltage swing detector, a voltage swing in the voltage of the channel that satisfies one of the first threshold value or the second threshold value, respectively; and
  causing, by the front-end circuit, in response to detecting the voltage swing, the activation switch to one of open or close, respectively.

14. A receiver comprising:
  an input pad coupled to a channel, wherein the channel is coupled in series to a capacitor and a transmission driver;
  a front-end circuit to detect, as data, transitions in voltage over the channel, the front-end circuit including an activation switch; and
  a voltage swing detector coupled between the input pad and the activation switch, the voltage swing detector to:
    detect a voltage swing in the voltage that satisfies one of a first threshold value or a second threshold value; and
    cause, in response to the detection, the activation switch to one of open or close, respectively.

15. The receiver of claim 14, wherein the activation switch, when closed, causes the receiver to operate in a transmission mode and, when opened, causes the receiver to be deactivated such that the voltage entering the front-end circuit is set to ground or supply voltage, causing inverters of the front-end circuit to not consume direct current.

16. The receiver of claim 14, further comprising logic coupled between the voltage swing detector and the activation switch, the logic configured to:
  detect a detection signal from the voltage swing detector generated in response to the detection; and
  trigger, in response to the detection signal, the activation switch to one of open or close.

17. The receiver of claim 16, wherein the logic is further configured to:
  generate a plurality of samples of the detection signal at different time instances; and
  perform an AND operation of the plurality of samples to prevent false detection of the voltage swing.

18. The receiver of claim 14, wherein
  the first threshold value is a pull-down voltage that is below a lowest voltage of the channel during a transmission mode; and
  the second threshold value is a pull-up voltage that is above a highest voltage of the channel during the transmission mode.

19. The receiver of claim 14, wherein
  the first threshold value is a pull-up voltage that is above a highest voltage of the channel during a transmission mode; and
  the second threshold value is a pull-down voltage that is below a lowest voltage of the channel during the transmission mode.

20. The receiver of claim 14, wherein the voltage swing detector comprises:
  a first comparator to compare the voltage with a low reference voltage to detect the first threshold value; and
  a second comparator to compare the voltage with a high reference voltage to detect the second threshold value.

21. The receiver of claim 14, wherein the voltage swing detector comprises a Schmitt trigger inverting comparator with a low threshold voltage to be compared with the first threshold value and a high threshold voltage to be compared with the second threshold value.

22. A method of operating a receiver comprising an input pad coupled to a channel coupled in series to a capacitor, a front-end circuit including an activation switch, and a voltage swing detector coupled between the channel and the activation switch, the method comprising:
  detecting, by the front-end circuit, data based on transitions in voltage over the channel;
  detecting, by the voltage swing detector, a voltage swing in the voltage that satisfies one of a first threshold value or a second threshold value; and
  causing, by the front-end circuit, in response to detecting the voltage swing, the activation switch to one of open or close, respectively.

* * * * *